(12) United States Patent
Lutz

(10) Patent No.: US 8,463,834 B2
(45) Date of Patent: Jun. 11, 2013

(54) FLOATING POINT MULTIPLIER WITH FIRST AND SECOND PARTIAL PRODUCT SHIFTING CIRCUITRY FOR RESULT ALIGNMENT

(75) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 873 days.

(21) Appl. No.: 12/588,962

(22) Filed: Nov. 3, 2009

(65) Prior Publication Data

US 2011/0106868 A1 May 5, 2011

(51) Int. Cl.
*G06F 7/487* (2006.01)
*G06F 5/01* (2006.01)

(52) U.S. Cl.
USPC ............ 708/501; 708/207; 708/513; 708/523

(58) Field of Classification Search
USPC ................................ 708/207, 501, 513, 523
See application file for complete search history.

(56) References Cited

U.S. PATENT DOCUMENTS

| | | | |
|---|---|---|---|
| 4,969,118 A | 11/1990 | Montoye et al. | |
| 5,010,508 A | 4/1991 | Sit et al. | |
| 5,631,859 A | 5/1997 | Markstein et al. | |
| 6,594,679 B1 | 7/2003 | Lee et al. | |
| 7,296,048 B2 * | 11/2007 | Ohmi et al. | 708/520 |
| 7,437,400 B2 | 10/2008 | Lutz et al. | |
| 7,668,892 B2 | 2/2010 | Lutz et al. | |
| 8,239,440 B2 * | 8/2012 | Brooks et al. | 708/501 |
| 2002/0107900 A1 | 8/2002 | Enenkel et al. | |
| 2006/0117080 A1 | 6/2006 | Lutz et al. | |
| 2006/0136543 A1 | 6/2006 | Lutz et al. | |
| 2006/0149803 A1 | 7/2006 | Siu et al. | |
| 2008/0256161 A1 | 10/2008 | Quinnell et al. | |
| 2009/0248779 A1 * | 10/2009 | Brooks et al. | 708/523 |
| 2010/0312812 A1 | 12/2010 | Wang | |

OTHER PUBLICATIONS

Huang et al., "A New Architecture for Multiple-Precision Floating-Point Multiply-Add Fused Unit Design", *18th IEEE Symposium—Computer Society*, 2007, 8 pages.
Office Action mailed Nov. 30, 2012 in co-pending U.S. Appl. No. 12/585,668.
U.S. Appl. No. 12/585,668, Lutz, filed Sep. 21, 2009.
U.S. Appl. No. 12/929,827, Lutz, filed Feb. 17, 2011.
UK Search Report dated May 10, 2012 in GB1200822.3.

(Continued)

*Primary Examiner* — Tammara Peyton
(74) *Attorney, Agent, or Firm* — Nixon & Vanderhye P.C.

(57) ABSTRACT

A floating point multiplier includes a data path in which a plurality of partial products are calculated and then reduced to a first partial product and a second partial product. Shift amount determining circuitry 100 analyzes the exponents of the input operands A and B as well as counting the leading zeros in the fractional portions of these operands to determine an amount of left shift or right shift to be applied by shifting circuitry 200, 202 within the multiplier data path. This shift amount is applied so as to align the partial products so that when they are added they will produce the result C without requiring this to be further shifted. Furthermore, shifting the partial products to the correct alignment in this way in advance of adding these partial products permits injection rounding combined with the adding of the partial products to be employed for cases including subnormal values.

15 Claims, 4 Drawing Sheets

Example A $1.01011101 * 2^{-1026}$
right shift by 4 bits
$0.00010101 * 2^{-1022}$ less than minimum exponent
subnormal Example B $0.00011011 * 2^{405}$
left shift by 4 bits
$1.10110000 * 2^{401}$ remove leading zeros Example C $0.00011011 * 2^{-1020}$
left shift by 2 bits
$0.01101100 * 2^{-1022}$ minimize leading zeros subject to $E_c \geq -1022$

OTHER PUBLICATIONS

Naini et al., 1-GHz HAL SPARC64 Dual Floating Point Unit with RAS Features, Proceedings of the 15$^{th}$ IEEE Symposium on Computer Arithmetic (ARITH'01), 2001, 11 pages.

Farmwald, "On the Design of High Performance Digital Arithmetic Units", *Lawrence Livermore National Laboratory* (Circulation Copy), Aug. 1981, 106 pages.

Schmookler et al., "Leading Zero Anticipation and Detection—A Comparison of Methods", *IEEE*, 2001, pp. 7-12.

Office Action mailed Oct. 5, 2012 in co-pending U.S. Appl. No. 12/585,668.

Office Action mailed Oct. 17, 2012 in co-pending U.S. Appl. No. 12/585,668.

* cited by examiner $(S_A, E_A, F_A)$  $(S_B, E_B, F_B)$ $A * B$ $\Updownarrow$ $\{S_A * S_B\} * \{1.F_A * 1.F_B\} * 2^{(E_A + E_B)}$ $\Downarrow$ product <2
OR  $\{S_A * S_B\} * 1.\{F_A * F_B\}[103:52]$ + Rounding Value
4>product>=2  $\{S_A * S_B\} * 1.\{F_A * F_B\}[104].\{F_A * F_B\}[103:53]$ + Rounding Value

FIG. 3

FLOATING POINT MULTIPLIER WITH FIRST AND SECOND PARTIAL PRODUCT SHIFTING CIRCUITRY FOR RESULT ALIGNMENT

BACKGROUND OF THE INVENTION

1. Field of the Invention

This invention relates to the field of data processing systems. More particularly, this invention relates to floating point multipliers for use within data processing systems.

2. Description of the Prior Art

It is known to provide data processing systems with the ability to manipulate floating point numbers. The hardware mechanisms for providing floating point multiplication typically use the multiplier and multiplicand to generate numerous partial products. Various forms of carry-save adders are then used to reduce the partial products to two partial products. These final two partial products are then added before being rounded to produce the final product result.

A problem with the above is how to deal with subnormal results. Subnormal results are where the exponent value has the minimum permitted value and the significand is less than one, e.g. 0.001101. The nature of subnormal numbers is familiar to those in this technical field. One way of dealing with subnormal numbers is to treat them as exceptions and handle their processing in software. This is a low performance solution. If subnormal numbers are to be handled in hardware, then a problem is that the output of the adder from the two partial products is unlikely to be properly aligned for rounding. This requires that adder output is shifted and then rounded using a further adder. The shifting and the further adder for the rounding introduces undesirable additional hardware and delay.

SUMMARY OF THE INVENTION

Viewed from one aspect the present invention provides an apparatus for performing a floating point multiply operation whereby a first floating point operand A is multiplied by a second floating point operand B to generate a floating point result C, said apparatus comprising:

partial product generation circuitry configured to receive said operand A and said operand B and to generate from said operand A and said operand B a plurality of partial products representing said result C;

reduction circuitry configured to receive said plurality of partial products and to reduce said plurality of partial products to a first partial product and a second partial product;

shifting circuitry configured to receive said first partial product and said second partial product and to shift said first partial product and said second partial product by a shift amount to an alignment matching said result C; and adder circuitry configured to receive said first partial product and said second partial product as shifted by said shift circuitry and to add said first partial product, said second partial product and a rounding value to round to a predetermined bit position to generate said result C.

The present technique recognises that by providing shifting circuitry operating on the first partial product and the second partial product prior to the adder circuitry it is possible, when necessary, to correct the alignment so as to match the result C prior to the adder circuitry adding the first partial product and the second partial product. This permits the rounding step to be incorporated within the adder circuitry by adding a rounding value to the first partial product and the second partial product so as to round to a predetermined bit position to generate the result C. This produces an advantageous reduction in delay with little hardware overhead. The requirement to shift both the first partial product and the second partial product might normally be seen as a disadvantage. However, incurring this additional processing overhead prior to the adder circuitry enables rounding to be combined with the addition of the first and second partial products in a manner that produces an overall benefit in the balance between performance and circuit overhead.

The shift amount determination circuitry may determine the shift amount to be applied by the shifting circuitry in response to a sum of exponent values of the operand A and the operand B as well as a count of leading zero values within the fractional values of the operand A and the operand B.

Given the finite bit size allocated to representing different portions of a floating point number, the result C will have a minimum permitted exponent value. This constraint gives rise to subnormal numbers and the shift amount applied to align the first and second partial products before addition and rounding should not result in an exponent value which is less than this minimum permitted value.

If the sum of the exponent value of the operand A and the exponent value of the operand B is less than the minimum permitted exponent value, then the shift amount determination circuitry may determine the shift amount to right shift the first partial product and the second partial product such that the exponent value of the result is the minimum permitted exponent value. The shifting circuitry will thus have the effect of producing a subnormal result. If the right shift applied to the first partial product and the second partial product is greater than an amount that results in the fractional value of the result being guaranteed to be zero, then the result will be set to one of a zero and a minimum subnormal value in dependence upon a current rounding mode of the apparatus.

If the sum of the exponent of the operand A and the exponent of the operand B is greater than the minimum permitted exponent value and at least one of the fractional values of the operand A and the operand B has one or more leading zeros, then the shift amount determination circuitry may determine the shift amount to left shift the first partial product and the second partial product so as to minimise the number of leading zeros in the result fraction value subject to the exponent value of the result not reducing below the minimum permitted exponent value.

The shifting circuitry could be provided in a variety of different forms. In one form the shifting circuitry comprises a first shifter configured to receive and shift the first partial product and a second shifter configured to receive and shift the second partial product.

The rounding value in some rounding modes is a "1" and the predetermined bit position is one bit position lower in significance than the lowest order bit of the fractional value of the result.

The floating point numbers may be signed and include sign bits.

In some embodiments the apparatus comprises a plurality of multiplier pipeline stages. In this context the shift amount determination circuitry may be part of a first pipeline stage of the plurality of multiplier pipeline stages.

The first partial product and the second partial product may be represented in a carry-save representation of the result.

In order to facilitate the rounding in combination with the addition of the first partial product and the second partial product, the adder circuitry may comprise two half adders which allows insertion of rounding values at either of two predetermined bit positions.

The input operands and the result together with the floating point multiply operation itself may all be compliant with the IEEE 754 standard and incorporate the present techniques.

Viewed from another aspect the present invention provides an apparatus for performing a floating point multiply operation whereby a first floating point operand A is multiplied by a second floating point operand B to generate a floating point result C, said apparatus comprising:

partial product generation means for receiving said operand A and said operand B and for generating from said operand A and said operand B a plurality of partial products representing said result C;

reduction means for receiving said plurality of partial products and for reducing said plurality of partial products to a first partial product and a second partial product;

shifting means for receiving said first partial product and said second partial product and for shifting said first partial product and said second partial product by a shift amount to an alignment matching said result C; and adder means for receiving said first partial product and said second partial product as shifted by said shifting means and for adding said first partial product, said second partial product and a rounding value to round to a predetermined bit position to generate said result C.

Viewed from a further aspect the resent invention provides a method of performing a floating point multiply operation whereby a first floating point operand A is multiplied by a second floating point operand B to generate a floating point result C, said method comprising the steps of:

generating from said operand A and said operand B a plurality of partial products representing said result C;

reducing said plurality of partial products to a first partial product and a second partial product;

shifting said first partial product and said second partial product by a shift amount to an alignment matching said result C; and following said shifting, adding said first partial product, said second partial product and a rounding value to round to a predetermined bit position to generate said result C.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 schematically illustrates a floating point multiplication operation.

DESCRIPTION OF THE PREFERRED EMBODIMENTS

Figure 1:
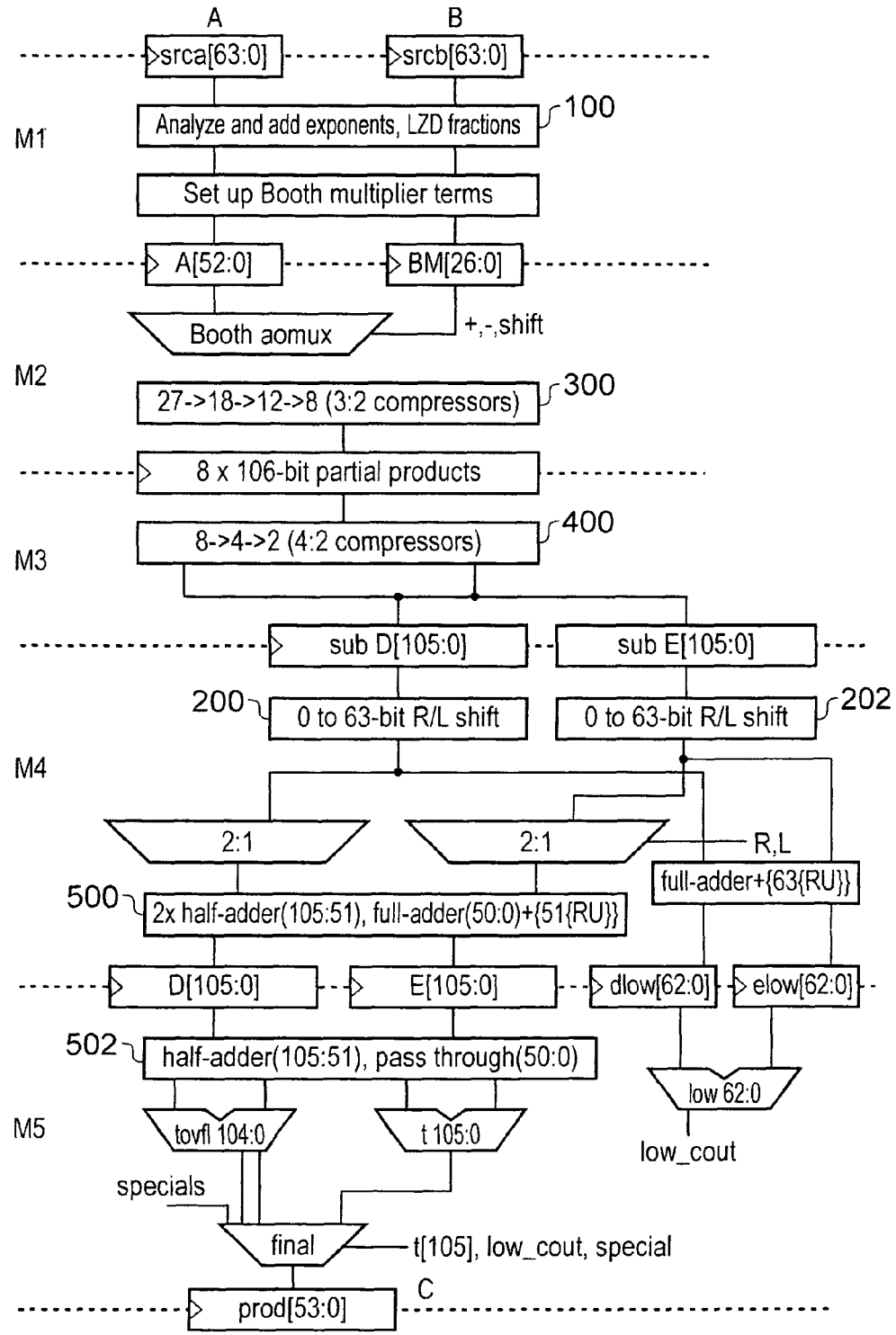
FIG. 1 illustrates a floating point multiplier pipeline.

FIG. 1 schematically illustrates a floating point multiplier pipeline. It will be appreciated that this floating point multiplier pipeline is typically part of a data processing apparatus, such as a processor core embodied as an integrated circuit. Program instructions being executed by the processor can specify floating point multiplication operations to be performed. This type of use of a floating point multiplier within an overall system will be familiar to those in this technical field. The following will be described in terms of the manipulation of double-precision numbers as defined as part of the IEEE 754 standard. It will be appreciated that the present techniques may be used with floating point numbers of other forms.

The double-precision floating point numbers are 64-bits in length and consist of a sign bit, 11 exponent bits and 52 fraction bits. A normalised number is of the form $1.fffff*2^{exp}$, where fffff represents the fraction bits. A subnormal number has a minimum exponent (i.e. 0 which represents an exponent of $-1022$ for double precision) and no leading 1. Thus, a subnormal number has a form such as $0.00fff*2^{-1022}$, i.e some number of leading zeros with a smaller fractional value and a fixed minimum exponent value.

In previous systems a typical way of dealing with subnormal numbers would be to normalise both inputs, generate 53 partial products (in the case of double precision numbers with standard multiplication—reduced to 27 partial products if Booth multiplication is used), reduce these partial products using 3:2 and 4:2 carry-save adders, add the two partial products, shift the sum to the correct position for output and add a rounding value (appropriate to the current rounding mode) at the correct position in order to round.

In contrast to the above, the present technique adopts a different approach. In this different approach the multiplier pipeline generates 53 partial products (in the case of a double precision point number), reduces these partial products to two partial products using 3:2 and 4:2 carry-save adders, shifts the two partial products to the correct alignment needed for the result and then adds the two partial products inserting a rounding value so that the sum is correctly rounded.

FIG. 1 shows the multiplier pipeline comprising five multiplier stages, namely stages M1, M2, M3, M4 and M5. In stage M1 the exponents of the input operands A and B are analysed and added by shift amount determining circuitry 100. This gives a first estimation of the exponent of the final product. This shift amount determining circuitry 100 also performs leading zero detection on the fractional values of the operands A and B (count how many zeros before the first one). The result of this summing of the exponents and the leading zero counting is used to determine the left/right shifts used by the shifting circuitry in stage M4.

If the computed exponent in the shift amount determining circuitry 100 is less than $-1022$ (in the case of double precision floating point numbers—other precisions will have other values for this minimum exponent value), then the shift amount will right shift the first and second partial product until the exponent reaches $-1022$. As an example, if the result value calculated from the exponents would be of a form such as $1.101*2^{-1024}$, then this is right shifted to $0.01101*2^{-1022}$. The right shift applied has a maximum magnitude of 63 bits. Beyond a 63 bit position shift the fraction will be zero and so the result will be set to be either zero or a minimum subnormal depending upon the rounding mode being used. The shifts applied are applied by the shifting circuitry 200, 202 in stage M4, but the computation of the shift amounts to be applied is started by the shift amount determining circuitry 100 in stage M1. If the computed exponent for the result is greater than $-1022$ and one of the input operands A and B is subnormal, then the shift amount is determined so as to left shift the first and second partial products in order to decrease or eliminate the leading zeros within the result. As an example, $0.011*2^{-600}$ is left shifted to $1.100*2^{-602}$. This left shifting is subject to a limit that the minimum exponent value of $-1022$ must be respected. As before, these left shifts are applied by the shifting circuitry 200, 202 in stage M4, but the computation of the shift amount is performed at least partially in stage M1.

Stage M1 also sets up the Booth multiplier terms for generating the partial products. The setting up of the multiplier terms and their use will be familiar to those in this technical field. It will be appreciated that Booth multiplication is not required for this technique and any multiplication method which results in two partial products may be used.

Stage M2 serves to reduce the partial products by the use of 3:2 compressors 300.

Stage M3 performs a further reduction of the partial products using 4:2 compressors 400. This type of reduction will be familiar to those in this technical field and is a normal part of multiplication. At the end of stage M3 there are two 106-bit partial products produced namely D[105:0] and E[105:0]. The shift amount determining circuitry 100 previously discussed has also determined the necessary amount of left or right shift to apply to these two partial products in order to suitably align the result C that will be generated from adding these two partial products whilst respecting minimum exponent values and reducing the leading zero count where possible.

Stage M4 includes shifting circuitry 200, 202 as a first shifter 200 for applying a 0 to 63 bits of right or left shift to the first partial product D [105:0]. In a similar way a second shifter 202 is provided for applying a 0 to 63-bit right or left shift to the second partial product E[105:0]. These shifters 200, 202 perform a left or right shift to correctly align the partial products so that the subsequent adders 500, 502 in stages M4 and M5 will produce a correctly aligned and rounded result does not require further shifting. Left shifts are applied to remove leading zeros introduced by subnormal input operands A or B.

Right shifts can lose bits needed for rounding purposes and so these right shifted bits are stored off into registers dlow and elow respectively. The pipeline of FIG. 1 uses injection rounding. For injection rounding full adders are used for the low-order adders for roundup rounding and half adders are used to leave room for the final rounding injection within the data path for the higher order bits.

Injection rounding is described in published US Patent Applications US-A-2006/0117080 and US-A-2006/0136543. The content of both of these earlier applications is incorporated herein in its entirety by reference.

In stage M5 adding and rounding is performed. The further half-adder 502 frees up a second point for injection rounding. Constants are inserted at these injection points as described in the above patents and in particular in the patent concerning multiplier rounding.

Two further adders are used. One adder (t) is used for results in the range 1-2 and the other adder (tovfl) for results in the range 2-4. If bit t[105] is set, then the tovfl result is the correct result, otherwise the t result is the correct result. The use of the tovfl adder does not arise for subnormal results as these are never in the range 2-4 and so the above adders may be used differently. In this case the t adder assumes no carrying from the low bits that were (possibly) right shifted into dlow and elow registers. The tovfl adder assumes a carry in from those bits. The adder marked "low62:0" generated a carry out signal low_cout that is used to distinguish which adder is correct.

Figures 2, 4:
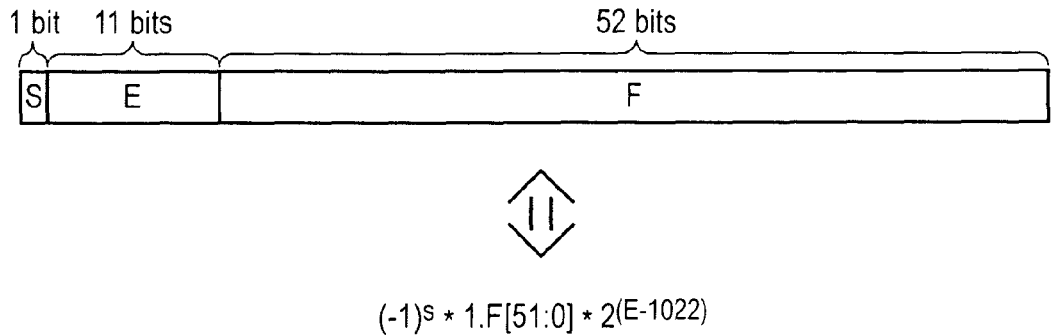
FIG. 2 schematically illustrates a floating point number.
FIG. 4 illustrates examples of different shift amounts applied by shifting circuitry in association with the manipulation of subnormal numbers.

FIG. 2 schematically illustrates the format of a double precision floating point number. This is a 64-bit number. The first bit is a sign bit S. The next 11 bits are exponent bits E. When all of the exponent bits E are zero or all are one, then these can be used to indicate special purpose numbers in accordance with the appropriate standard. The remaining 52-bits of the double precision number are the fraction bits F.

FIG. 2 shows how the bits within the 64-bit floating point representation that is manipulated by the multiplier correspond to a floating point number as would be understood by a mathematician. The sign bit S is used to specify whether the number is positive or negative. For normal numbers (as distinct from subnormal numbers) there is an assumption that the significand starts with a leading value of "1" before the decimal point. Accordingly, this leaving value need not be specified within the floating point number. Thus all 52-bits of the fraction correspond to the 52-bits of the significand to the right of the decimal point. The 11-bit exponent value E is subject to an offset of "−1023" so that normal exponent values can span the range +1023 to −1022. (The 11-bit exponent E has a value between 0 and 2047. For values of E from 1 to 2046, the true exponent is computed by subtracting 1023 from E. For E=2047, the number is an infinity or NaN, and for E=0, the true exponent is −1022. Note that E=1 also has a true exponent of −1022, but E=1 is a normal number and so has the form $1.xxx*2^{-1022}$, whereas E=0 is subnormal and so has the form $0.xxx*2^{-1022}$.) It will be appreciated that the double precision floating point number illustrated in FIG. 2 is only one example of the numbers which can be manipulated in accordance with the present technique. Other precisions of number may be manipulated and other formats used. The present technique encompasses these alternatives.

FIG. 3 illustrates how an input operand A and an input operand B are multiplied together. These input operands A and B each comprise a sign S, an exponent E portion and fraction F portion as discussed in relation to FIG. 2. When these two input operands A and B are multiplied together, the mathematical result is as illustrated in FIG. 3 (It will be appreciated that this is an intermediate result at the final result would be normalized to $\{S_A*S_B\}*1.\{F_A*F_B\}[104:53]+$ Rounding Value, and the exponent would be increments by one.) In particular, the sign bits $S_A$ and $S_B$ are multiplied together in order to determine the sign bit $S_C$ of the result. C The two significands formed from the fractional values $F_A$ and $F_B$ are multiplied together. As the significands are each 53-bit numbers, the resulting result significand will be a 106-bit number. Only the most significant 53 of these bits are needed for the result value and the remaining portion is used to control the rounding depending upon the rounding mode. The final portion of the result value is the exponent $E_C$. The exponent is calculated as the sum of the exponents $E_A$ and $E_B$ of the input operand A and the input operand B.

As discussed above, injection rounding is used in the present example embodiments. As described in the previously mentioned published patent applications (which are incorporated herein in their entirety by reference) the injection rounding is achieved by adding a rounding value so as to round to a predetermined bit position. The rounding value is added to round to bit position 52 when the resulting product C has a value of less than 2. Conversely, when the result product value has a magnitude between 4 and 2 then the rounding value is added to round to bit position 53.

FIG. 4 illustrates some examples of how the shift amount determining circuitry and shifting circuitry of FIG. 1 may be employed to deal with subnormal numbers. Example A illustrates the situation in which the result C has an exponent value which is less than the minimum exponent value. In this example, the calculated exponent value from summing the exponent of operand A and the exponent of operand B is "−1026". This is less than the minimum value of "−1022". Accordingly, the shift amount determining circuitry 100 detects this problem and determines that the shift amount should be a right shift by four bit positions. This returns the exponent to a legal value of "−1022". However, the significand is now subnormal and the fraction has three leading zeros.

Example B of FIG. 4 illustrates a result value generated when one of the input operand A and the input operand B is subnormal. In this case the result significand first calculated would be subnormal. Providing the limit on the minimum size of the exponent of the result C will not be exceeded then these leading zeros can be removed and the significand returned to a normal value by left shifting four bit positions. This is illustrated in FIG. 4 Example B. The bit values shifted in to the significand as it is left shifted may be taken from the low order portion of the effectively 106-bit result which is calculated as discussed above.

Example C of FIG. 4 illustrates a situation similar to that of Example B except that in this case the exponent value is close to the minimum exponent value and accordingly only a left shift of two bit positions is permitted in order that the minimum exponent value limit is not breached.

Figure 5:
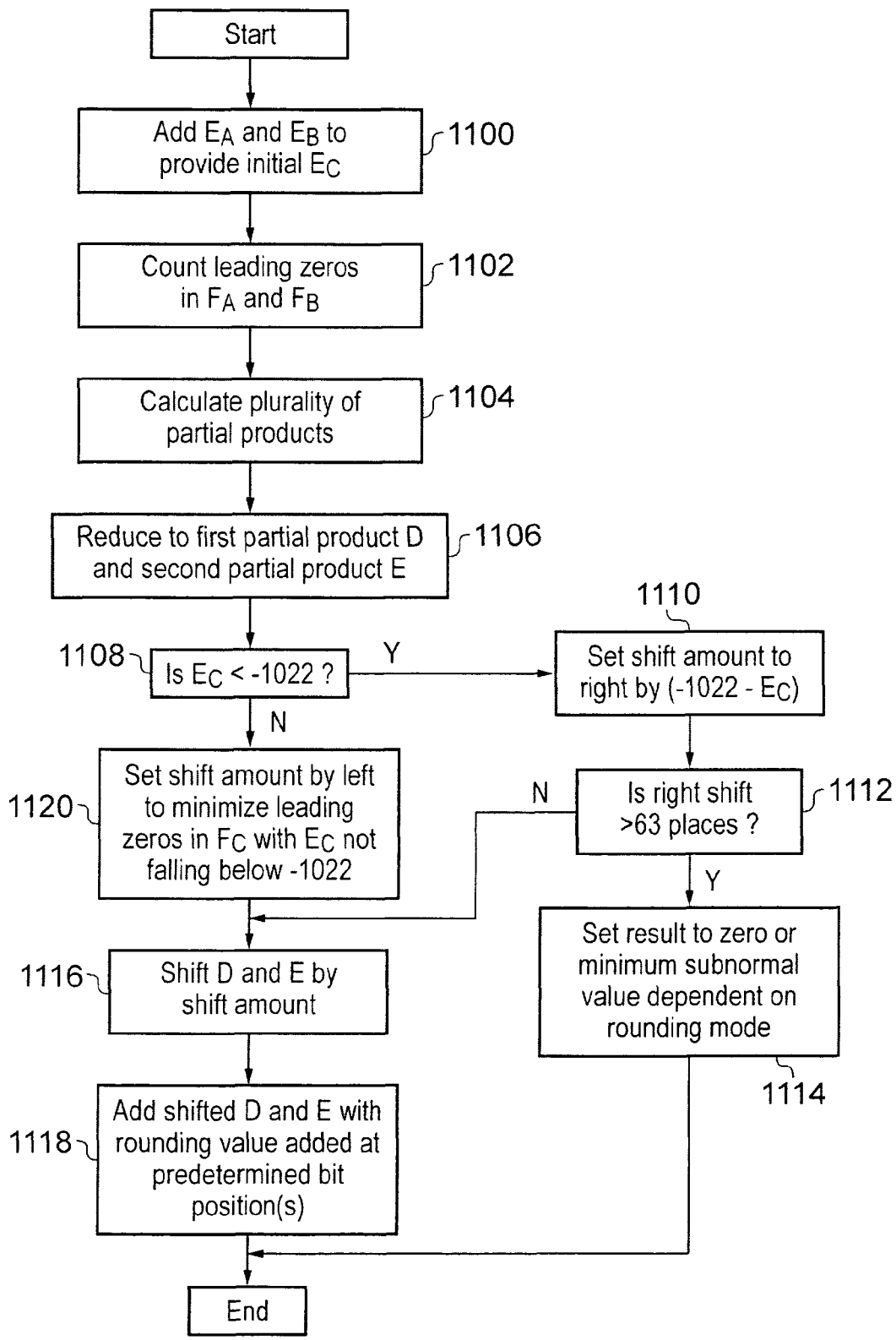
FIG. 5 is a flow diagram schematically illustrating the operation of the multiplier of FIG. 1.

FIG. 5 is a flow diagram schematically illustrating the operation of the circuit of FIG. 1. At step 1100 the shift value determining circuitry adds the exponents $E_A$ and $E_B$ of the input operand A and the input operand B to provide an initial value of the result exponent $E_C$. At step 1102 the shift value determining circuitry counts the number of leading zeros in the fractional values $F_A$ and $F_B$ of the input operands A and B. At step 1104 the multiplier calculates the plurality of partial products. At step 1106 the reducing circuitry comprised of 3:2 compressors 300 and 4:2 compressors 400 reduces the plurality of partial products down to a first partial product D and a second partial product E.

At step 1108 a determination is made as to whether or not the result exponent $E_C$ is less than the minimum permitted value, i.e. is less than "−1022" in the case of a double precision floating point number.

If the minimum exponent value limit has been breached, then step 1110 sets the shift amount to right shift by an amount that will restore the result exponent to a legal value, i.e. the minimum permitted value. Step 1112 then checks as to whether or not this right shift is greater than 63 places. If the right shift was greater than 63 places, then the fraction value will have been reduced to zero and accordingly step 1114 sets the result to a zero result or a minimum subnormal value depending upon the rounding mode currently in force. If the right shift has not exceeded 63 places then processing proceeds to step 1116 where the shift amount calculated as applied by the shifting circuitry to the first partial product D and the second partial product E. This shifting aligns these partial products prior to their adding in a manner such that the result C will have the correct alignment for output without further shifting and so that the rounding value can be inserted at the predetermined point so as to round to the predetermined bit position. Step 1118 performs the add of the shifted partial products with the rounding value added at the predetermined bit positions as previously discussed.

If the determination at step 1108 was that the minimum exponent value was not exceeded, then step 1120 sets the shift amount to left shift by any amount necessary to minimise the number of leading zeros in the fractional value of the result $F_C$ providing the exponent value of the result $E_C$ does not fall below the minimum permitted value of "−1022". It may be that the shift value determining circuitry 100 has not detected any leading zeros within the fractional value $F_C$ of the result C and accordingly no left shift will be required. The shift amount determining circuitry 100 may count leading zeros in each of the input operands A and B and use this to determine the number of leading zeros which will be present within the result fraction $F_C$. Following step 1120 which removes subnormality subject to the minimum exponent value limit not being breached, processing then proceeds to step 1116.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for performing a floating point multiply operation whereby a first floating point operand A is multiplied by a second floating point operand B to generate a floating point result C, said apparatus comprising:
   partial product generation circuitry configured to receive said operand A and said operand B and to generate from said operand A and said operand B a plurality of partial products representing said result C;
   reduction circuitry configured to receive said plurality of partial products and to reduce said plurality of partial products to a first partial product and a second partial product;
   shifting circuitry configured to receive said first partial product and said second partial product and to shift said first partial product and said second partial product by a shift amount to an alignment matching said result C;
   adder circuitry configured to receive said first partial product and said second partial product as shifted by said shift circuitry and to add said first partial product, said second partial product and a rounding value to round to a predetermined bit position to generate said result C;
   and wherein said shifting circuitry comprises a first shifter configured to receive said first partial product and to shift said first partial product by said shift amount and a second shifter configured to receive said second partial product and to shift said second partial product by said shift amount.

2. Apparatus as claimed in claim 1, wherein said operand A includes an exponent value $E_A$ and a fraction value $F_A$ and said operand B includes an exponent value $E_B$ and a fraction value $F_B$.

3. Apparatus as claimed in claim 2, comprising shift amount determination circuitry responsive to a sum of said exponent value $E_A$ and said exponent value $E_B$ and to a count of leading zero values within said fraction value $F_A$ and said fraction value $F_B$ to determine said shift amount.

4. Apparatus as claimed in claim 3, wherein said result C includes an exponent value $E_C$ and a fraction value $F_C$ and said exponent value $E_C$ has a minimum permitted exponent value of $E_{Cmin}$.

5. Apparatus as claimed in claim 4, wherein if said sum of said exponent value $E_A$ and said exponent value $E_B$ is less than said minimum permitted exponent value $E_{Cmin}$, then said shift amount determination circuitry determines said shift amount to right shift said first partial product and said second partial product such that said exponent value $E_C$ is said minimum permitted exponent value $E_{Cmin}$.

6. Apparatus as claimed in claim 5, wherein if said right shift is greater than an amount that results in said fraction value $F_C$ being guaranteed to be a zero value, then said result C is set to be one of zero and a minimum subnormal value in dependence upon a current rounding modes of said apparatus.

7. Apparatus as claimed in claim 4, wherein if said sum of said exponent value $E_A$ and said exponent value $E_B$ is greater than said minimum permitted exponent value $E_{Cmin}$ and at least one of said fraction value $F_A$ and said fraction value $F_B$ has one or more leading zeros, then said shift amount determination circuitry determines said shift amount to left shift said first partial product and said second partial product to minimize a number of leading zeros in said fraction value $F_C$ subject to said exponent value $E_C$ not reducing below said minimum permitted exponent value $E_{Cmin}$.

8. Apparatus as claimed in claim 1, wherein said result C includes an exponent value $E_C$ and a fraction value $F_C$ and said exponent value $E_C$ has a minimum permitted exponent value of $E_{Cmin}$, said rounding value is one and said predetermined bit position is one bit position lower in significance than a lowest order bit of said fraction value $F_C$.

9. Apparatus as claimed in claim 1, wherein said operand A, said operand B and said result C include respective sign bits $S_A$, $S_B$ and $S_C$.

10. Apparatus as claimed in claim 3, wherein said apparatus comprises a plurality of multiplier pipeline stages and said shift amount determination circuitry is part of a first pipeline stage of said plurality of multiplier pipeline stages.

11. Apparatus as claimed in claim 1, wherein said first partial product and said second partial product are a carry-save representation of said result C.

12. Apparatus as claimed in claim 1, wherein said adder circuitry comprises two half adders to permit insertion of rounding values at either of two predetermined positions.

13. Apparatus as claimed in claim 1, wherein said operand A, said operand B, said operand C and said floating point multiply operation all comply with the IEEE 754 standard.

14. Apparatus for performing a floating point multiply operation whereby a first floating point operand A is multiplied by a second floating point operand B to generate a floating point result C, said apparatus comprising:
   partial product generation means for receiving said operand A and said operand B and for generating from said operand A and said operand B a plurality of partial products representing said result C;
   reduction means for receiving said plurality of partial products and for reducing said plurality of partial products to a first partial product and a second partial product;
   shifting means for receiving said first partial product and said second partial product and for shifting said first partial product and said second partial product by a shift amount to an alignment matching said result C;
   adder means for receiving said first partial product and said second partial product as shifted by said shifting means and for adding said first partial product, said second partial product and a rounding value to round to a predetermined bit position to generate said result C; and wherein said shifting circuitry comprises a first shifter configured to receive said first partial product and to shift said first partial product by said shift amount and a second shifter configured to receive said second partial product and to shift said second partial product by said shift amount.

15. A method of performing a floating point multiply operation whereby a first floating point operand A is multiplied by a second floating point operand B to generate a floating point result C, said method comprising the steps of:
   generating from said operand A and said operand B a plurality of partial products representing said result C;
   reducing said plurality of partial products to a first partial product and a second partial product;
   shifting said first partial product and said second partial product by a shift amount to an alignment matching said result C;
   following said shifting, adding said first partial product, said second partial product and a rounding value to round to a predetermined bit position to generate said result C; and wherein said shifting circuitry comprises a first shifter configured to receive said first partial product and to shift said first partial product by said shift amount and a second shifter configured to receive said second partial product and to shift said second partial product by said shift amount.

* * * * *